No. 615,953. Patented Dec. 13, 1898.
C. S. BRADLEY.
CONTROLLING ALTERNATING CURRENT MOTORS.
(Application filed July 14, 1897.)
(No Model.)
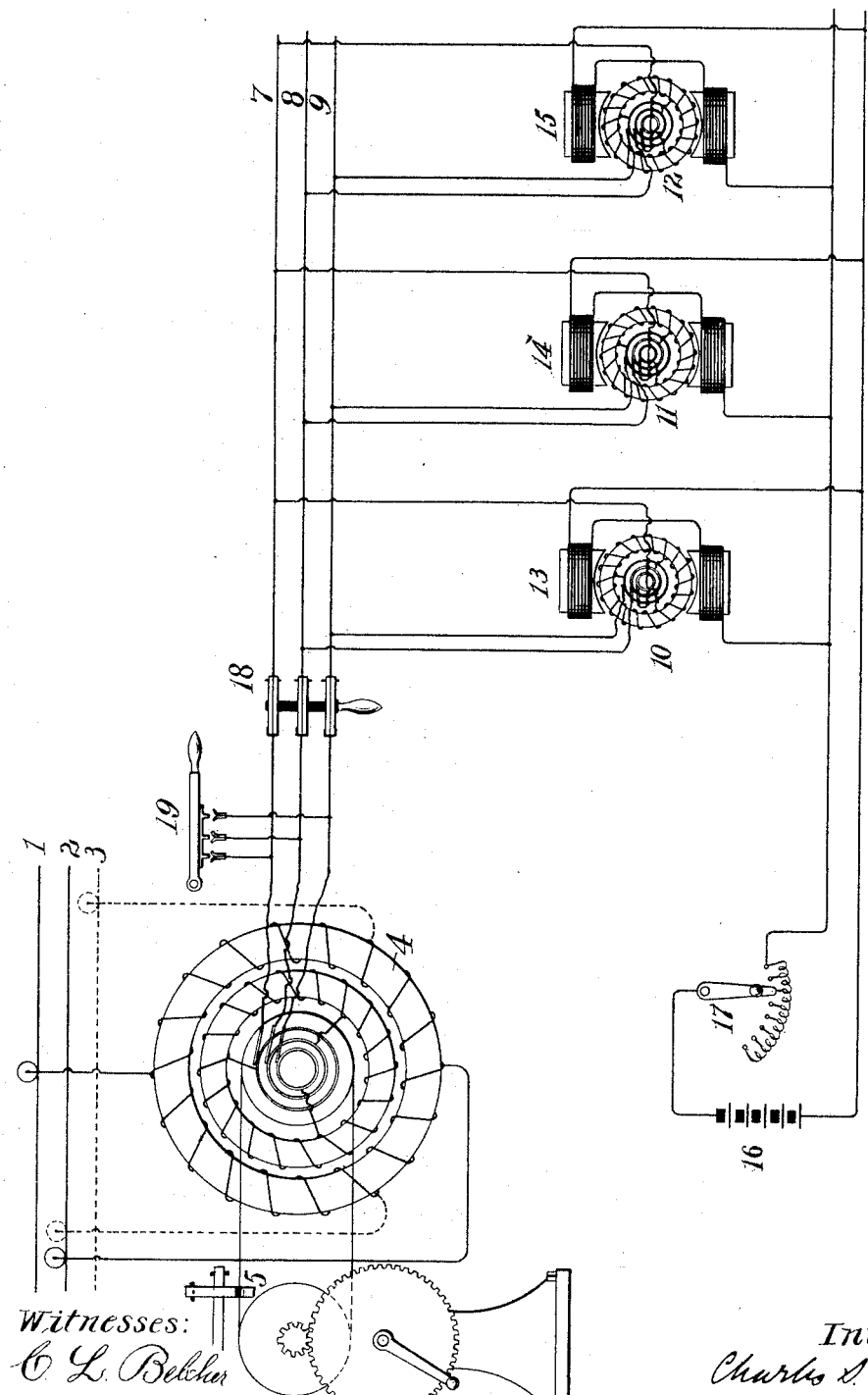
Witnesses:
C. L. Belcher
Elizabeth Ewing
Inventor
Charles S. Bradley
By
Robt. J. Read
his Attorney

UNITED STATES PATENT OFFICE.

CHARLES S. BRADLEY, OF AVON, NEW YORK.

CONTROLLING ALTERNATING-CURRENT MOTORS.

SPECIFICATION forming part of Letters Patent No. 615,953, dated December 13, 1898.

Application filed July 14, 1897. Serial No. 644,476. (No model.)

*To all whom it may concern:*

Be it known that I, CHARLES S. BRADLEY, a citizen of the United States, and a resident of Avon, county of Livingston, State of New York, have invented certain new and useful Improvements in Controlling Alternating-Current Motors, of which the following is a specification.

This invention relates to the electrical transmission of power, the object being to operate at a variable speed a plurality of electric motors.

The invention is particularly designed for use in operating railway-trains, where it is desirable to drive a number of motors at the same speed and to start them with strong torque.

In carrying out the invention I employ a rotary transformer or motor-generator of suitable construction to be operated by a single-phase alternating current and supply from a secondary winding of this transformer a work-circuit including the motors to be driven. The driven motors have their armatures supplied with polyphase alternating currents from the secondary of the rotary transformer. With this organization the frequency of alternation is dependent upon the slip of the rotary transformer, the rate of alternation being low when the slip is small and higher as the slip increases. In order to produce a strong starting torque in the driven motors, it is essential that the speed of the rotary poles developed in their armatures shall be low. When the motors are once started, it is necessary in order to accelerate their speed to increase the rate of alternation. I accomplish this result by exciting the field-magnet of the driven motors by an independent circuit, including a source of direct current and a rheostat by which the strength of current may be varied. I find that a motor having a direct-current-charged field-magnet may be employed as a substitute for a condenser and that its capacity may be varied by varying the strength of its field-magnetizing current, a strong field giving a greater capacity than a weak field. By adjusting the rheostat, therefore, a considerable range of variation of capacity may be secured. As set forth in a prior application made by me, Serial No. 596,423, dated June 22, 1896, a variation of the capacity of the work-circuit may be used to vary the slip of an alternating-current rotary transformer, and therefore may control the rate of alternation in a work-circuit supplied by such a transformer. In the present application this result is effected by a modification of the field strength of the driven motors. In starting up, the rotary transformer is running or caused to run at its highest speed, thereby producing in the work-circuit, by reason of the small slip, a low rate of alternation. The rheostat controlling the driven motors is shifted so as to give a maximum current strength, thus raising the capacity of the work-circuit to a point where it is in good working relation to the inductance. The maximum starting torque is realized when the adjustment is such that the work-circuit is resonant to a very low rate of alternation, as a maximum current would flow in the work-circuit under such an adjustment. After starting up, the motors may be increased in speed by weakening their field-magnet strength, the change of capacity resulting from such adjustment causing a greater slip in the rotary transformer and increasing the rate of alternation, and therefore the speed of the driven motors.

My invention therefore comprises a rotary transformer combined with a work-circuit supplied thereby and including a plurality of motors the armatures of which are in the work-circuit and the field-magnets of which are excited by a variable direct current.

The accompanying drawing diagrammatically illustrates my invention.

1 2 represent a supply-circuit, which may be fed with single-phase alternating currents. Polyphase currents might, however, be employed in this circuit, as indicated at 3. The supply-circuit develops a rotary magnetic field in the primary circuit of the rotary transformer 4. When single-phase currents are employed, the motor-transformer should be provided with a starting device, which may be crank-operated, as indicated at 5. With a polyphase supply-circuit, the connections of which are indicated in dotted lines, no such starting devices are required. The secondary of the rotary transformer supplies a work-circuit 7 8 9, in which are included the armatures 10 11 12 of a series of motors the field-magnets 13 14 15 of which are excited by a source of direct current 16, a rheostat 17 being included in the circuit for the purpose of varying the field-magnet strength. In starting up, a switch 18 in the work-circuit should be opened and the switch 19 closed and the rotary transformer brought to its maximum speed. The small slip at this speed develops an alternating electromotive force of low frequency in the secondary. The switch may then be closed on the motors, and as they rise in speed the capacity may be reduced relatively to the inductance, thus causing an increased slip of the rotary transformer by decreasing the field magnetism of the motors. Currents of greater frequency are therefore supplied to the work-circuit, and the motors operate at a higher speed. The secondary winding of the motor-generator should be short-circuited in starting, and for this purpose a switch, such as 19, may be employed.

The organization herein described may of course be employed for other service than the operation of railway-trains. It may be employed in any contingency in which it is desirable to operate a group of motors at a variable controllable speed.

Having thus described my invention, what I claim as new, and desire to secure by Letters Patent, is—

An alternating-current system comprising a source of alternating currents, a free-running motor-generator supplied thereby, a work-circuit supplied with alternating currents by the motor-generator, a plurality of motors having their armatures supplied by the work-circuit and their field-magnets excited by a direct current, and means for varying the strength of the direct current.

In testimony whereof I have hereunto subscribed my name this 21st day of June, A. D. 1897.

CHARLES S. BRADLEY.

Witnesses:
C. R. WATERBURY,
ROBT. H. READ.